US012683279B2

(12) United States Patent
Lv et al.

(10) Patent No.: US 12,683,279 B2
(45) Date of Patent: Jul. 14, 2026

(54) ANTENNA ASSEMBLY AND BASE STATION ANTENNA

(71) Applicant: Outdoor Wireless Networks LLC, Claremont, NC (US)

(72) Inventors: Fusheng Lv, Suzhou (CN); Zhanming Zhang, Suzhou (CN); Fan He, Suzhou (CN)

(73) Assignee: OUTDOOR WIRELESS NETWORKS LLC, Richardson, TX (US)

( * ) Notice: Subject to any disclaimer, the term of this patent is extended or adjusted under 35 U.S.C. 154(b) by 394 days.

(21) Appl. No.: 18/342,940

(22) Filed: Jun. 28, 2023

(65) Prior Publication Data

US 2024/0006771 A1 Jan. 4, 2024

(30) Foreign Application Priority Data

Jun. 29, 2022 (CN) ......................... 202210755161.6

(51) Int. Cl.

| | |
|---|---|
| ***H01Q 1/24*** | (2006.01) |
| ***H01Q 9/04*** | (2006.01) |
| ***H01Q 19/10*** | (2006.01) |
| ***H01Q 21/06*** | (2006.01) |

(52) U.S. Cl.

CPC ........... *H01Q 9/0442* (2013.01); *H01Q 1/246* (2013.01); *H01Q 19/10* (2013.01); *H01Q 21/065* (2013.01)

(58) Field of Classification Search

CPC .... H01Q 19/10; H01Q 19/028; H01Q 21/065; H01Q 21/28; H01Q 1/50; H01Q 1/38; H01Q 1/246; H01Q 9/0442

See application file for complete search history.

(56) References Cited

U.S. PATENT DOCUMENTS

| | | | | |
|---|---|---|---|---|
| 2020/0044365 | A1* | 2/2020 | Song | H01Q 5/392 |
| 2020/0119447 | A1* | 4/2020 | Isik | H01Q 1/24 |
| 2020/0303836 | A1* | 9/2020 | Li | H01Q 21/245 |
| 2021/0344122 | A1* | 11/2021 | Kaistha | H01Q 19/108 |
| 2022/0200151 | A1* | 6/2022 | Wang | H01Q 9/0457 |
| 2023/0104131 | A1* | 4/2023 | Varnoosfaderani | H01Q 21/062 343/702 |
| 2023/0291122 | A1* | 9/2023 | Xue | H01Q 21/24 |
| 2024/0186711 | A1* | 6/2024 | Li | H01Q 19/108 |

FOREIGN PATENT DOCUMENTS

| | | | | |
|---|---|---|---|---|
| CN | 108777353 | * | 5/2018 | |
| WO | WO-2018111690 A1 | * | 6/2018 | H01Q 19/005 |

* cited by examiner

*Primary Examiner* — Awat M Salih

(74) *Attorney, Agent, or Firm* — Myers Bigel, P.A.

(57) ABSTRACT

An antenna assembly is provided which includes: a feeder panel; an array of radiating elements mounted on the feeder panel; a plurality of metal tubes mounted to extend forwardly from the feeder panel, where at least a portion of radiating elements in the array of radiating elements are surrounded by at least four metal tubes spaced apart, respectively. In addition, a base station antenna including the antenna assembly may be provided. The antenna assembly is capable of effectively improving the cross-polarization performance of the base station antenna and improving the radiation boundary of the base station antenna.

17 Claims, 6 Drawing Sheets

ANTENNA ASSEMBLY AND BASE STATION ANTENNA

CROSS-REFERENCE TO RELATED APPLICATION(S)

This application claims benefit of priority to Chinese Patent Application No. 202210755161.6 filed on Jun. 29, 2022 in the China National Intellectual Property Administration, the disclosure of which is incorporated herein by reference in its entirety for all purposes.

BACKGROUND

The present disclosure relates generally to radio communications, and more particularly to an antenna assembly and a base station antenna.

In some traditional base station antennas, fences may be provided around radiating elements to improve isolation. A fence refers to a metal wall or metallized wall extending forwardly from a reflector of a base station antenna that is positioned to increase the degree of isolation between radiating elements of the base station antenna. For example, the fences may be mounted directly on the reflector, or on one or more feed boards mounted on a front surface of the reflector. However, mounting these fences to extend forwardly from the reflector may also undesirably increase the cost and/or weight of the base station antenna.

In addition, with the development of the communication system, there may be higher requirements for the cross-polarization performance of the base station antenna.

SUMMARY

Therefore, the object of the present disclosure is to provide an antenna assembly and a base station antenna capable of overcoming at least one drawback in the prior art.

According to a first aspect of the present disclosure, an antenna assembly is provided, which comprises:

- a feed board;
- an array of radiating elements mounted on the feed board; and
- a plurality of metal tubes mounted to extend forwardly from the feed board, wherein at least some of the radiating elements in the array of radiating elements are surrounded by at least four metal tubes spaced apart, respectively.

In some embodiments, four metal tubes surrounding a corresponding radiating element form a contour larger than a contour of the corresponding radiating element.

In some embodiments, the four metal tubes surrounding the corresponding radiating element form a rectangle contour.

In some embodiments, four metal tubes surrounding a corresponding radiating element are at four corners of the corresponding radiating element, so that the first metal tube and the second metal tube of the four metal tubes are spaced apart from each other along a longitudinal direction on a first side of the corresponding radiating element, and a third metal tube and a fourth metal tube are spaced apart from each other along the longitudinal direction on a second side opposite the first side of the corresponding radiating element.

In some embodiments, four metal tubes surrounding a corresponding radiating element are configured to tune a radiation boundary of the corresponding radiating element.

In some embodiments, a column of metal tubes is shared between a first column of radiating elements and a second column of radiating elements in the array of radiating elements.

In some embodiments, two metal tubes are shared between every two radiating elements in the first column of radiating elements, and two metal tubes are shared between every two radiating elements in the second column of radiating elements.

In some embodiments, the array of radiating elements is configured as an array of patch radiating elements.

In some embodiments, at least a portion of the metal tubes extend forwardly from the feed board as far as the radiating elements.

In some embodiments, at least a portion of the metal tubes extend forwardly from the feed board farther than the radiating elements.

In some embodiments, at least a portion of the metal tubes are mounted to extend forwardly from the feed board by 1/6 to 1/8 of a wavelength which corresponds to a center frequency of an operating frequency band of the corresponding array of radiating elements.

In some embodiments, each metal tube is configured as a hollow metal conductor.

In some embodiments, each metal tube is axially symmetrical in a longitudinal and/or horizontal direction.

In some embodiments, at least a portion of the metal tubes are formed by extrusion forming or punch forming.

In some embodiments, at least a portion of the metal tubes are wound and formed by a metal plate.

In some embodiments, at least a portion of the metal tubes are configured to be cylindrical, domed, prismatic, or have a shape of frustum of a pyramid.

In some embodiments, a tuning strip is configured on at least a portion of the metal tubes, and the tuning strip extends outwardly from an outer peripheral wall of the corresponding metal tube by a predetermined distance.

In some embodiments, the tuning strip is configured at a front end portion of the corresponding metal tube.

In some embodiments, a first tuning strip is configured on a corresponding metal tube, the first tuning strip extending outwardly from an outer peripheral wall of the metal tube by a predetermined distance in the longitudinal direction; and/or a second tuning strip is configured on a corresponding metal tube, the second tuning strip extending outwardly from an outer peripheral wall of the metal tube by a predetermined distance in the horizontal direction.

In some embodiments, an outer diameter of each metal tube is 1/10 to 1/20 of a wavelength which corresponds to a center frequency of an operating frequency band of the corresponding array of radiating elements.

In some embodiments, at least a portion of the metal tubes are electrically connected to the feed board.

In some embodiments, each metal tube and each radiating element are mounted to the feed board by means of a surface mounting technology.

In some embodiments, ground pads for the at least a portion of the metal tubes are printed on the feed board, and the corresponding metal tubes are welded to the ground pads.

In some embodiments, the ground pads are electrically connected to a ground layer of the feed board through a metalized via or a conductor.

In some embodiments, each metal tube is configured as a tin-plated hollow aluminum conductor or a tin-plated hollow copper conductor.

According to a second aspect of the present disclosure, an antenna assembly is provided, which comprises:

a feed board;

an array of radiating elements mounted on the feed board, the array of radiating elements comprising a first column of radiating elements and a second column of radiating elements; and an array of metal tubes mounted to extend forwardly from the feed board, the array of metal tubes comprising a first column of metal tubes arranged between the first column of radiating elements and the second column of radiating elements.

In some embodiments, the array of metal tubes comprises a second column of metal tubes and a third column of metal tubes mounted to extend forwardly from the feed board.

In some embodiments, the first column of metal tubes and the second column of metal tubes are arranged on both sides of the first column of radiating elements, and the first column of metal tubes and the third column of metal tubes are arranged on both sides of the second column of radiating elements.

In some embodiments, at least a portion of the radiating elements in the array of radiating elements are surrounded by four metal tubes spaced apart, respectively.

In some embodiments, the array of metal tubes is further configured to tune a radiation boundary of the array of radiating elements and/or improve cross-polarization discrimination of a radiation pattern of a beam of the array of radiating elements.

In some embodiments, the array of radiating elements is configured as an array of patch radiating elements.

In some embodiments, the array of metal tubes extends forwardly from the feed board farther than the array of radiating elements.

In some embodiments, the array of metal tubes and/or the array of radiating elements are mounted to the feed board by means of surface mounting technology.

In some embodiments, the array of metal tubes is electrically connected to the feed board.

In some embodiments, an array of ground pads for the array of metal tubes is printed on the feed board, and the corresponding metal tubes are soldered to the ground pads.

In some embodiments, the ground pads are electrically connected to a ground layer of the feed board through a metalized via or a conductor.

In some embodiments, an operating frequency band of the array of radiating elements is at least a portion of a frequency band in the range of 3500 to 5000 MHz.

According to a third aspect of the present disclosure, a base station antenna is provided, wherein the base station antenna comprises a reflector and the antenna assembly mounted in front of the reflector according to any one of the embodiments of present disclosure.

In some embodiments, the base station antenna is configured as a massive multiple-input and multiple-output (MIMO) antenna.

Some embodiments of the present disclosure are capable of effectively reducing the weight and/or cost of the base station antenna. Some embodiments of the present disclosure are capable of effectively improving the cross-polarization performance, for example, the cross-polarization discrimination rate, of the base station antenna. Some embodiments of the present disclosure are capable of effectively improving the radiation boundary of the base station antenna.

BRIEF DESCRIPTION OF THE DRAWINGS

The present disclosure will be explained in greater detail by means of specific embodiments with reference to the attached drawings. The schematic drawings are briefly described as follows.

DETAILED DESCRIPTION

Figure 1:
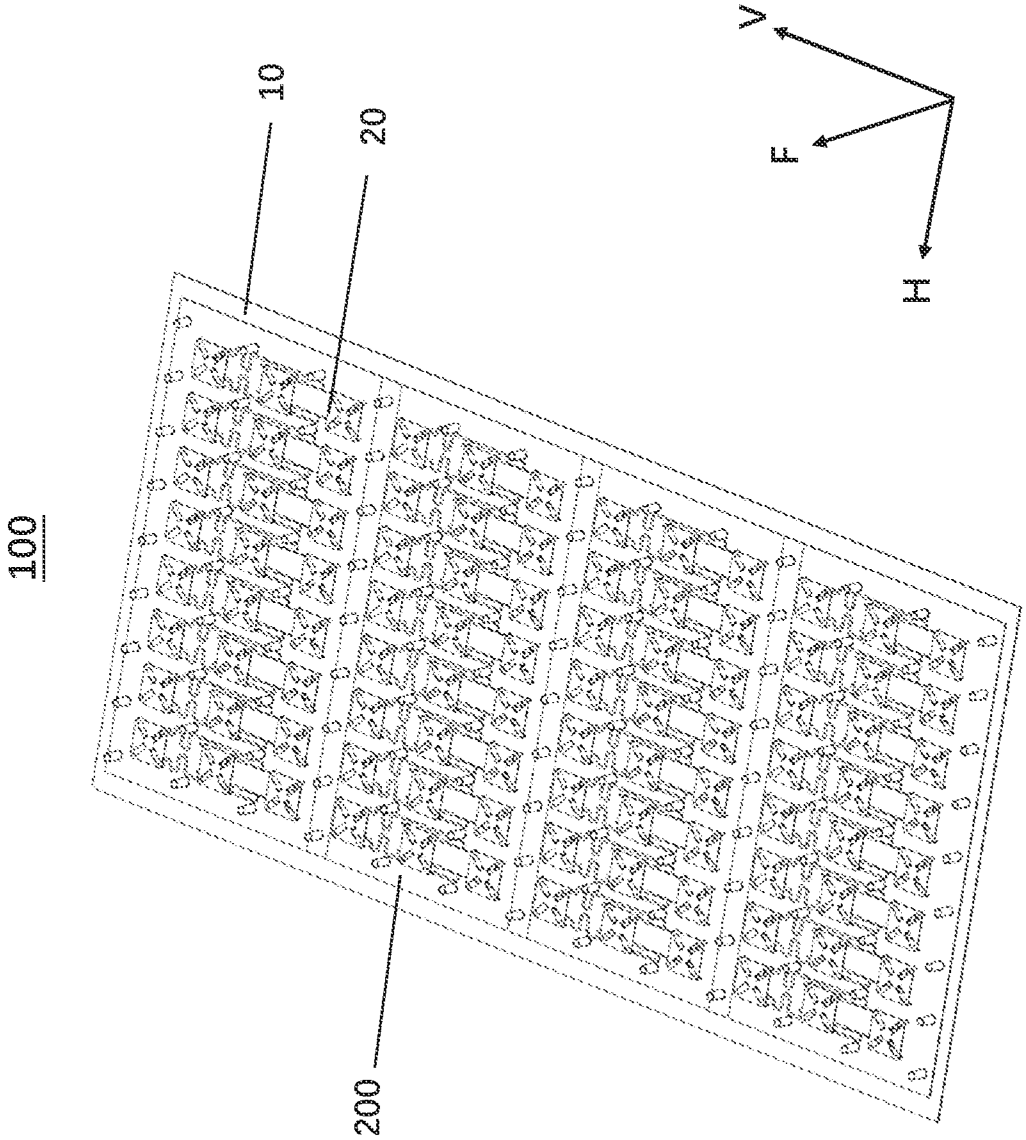
FIG. 1 is a schematic perspective view of a base station antenna according to some embodiments of the present disclosure, in which, a radome is removed.

The present disclosure will be described below with reference to the attached drawings, wherein the attached drawings illustrate certain embodiments of the present disclosure. However, it should be understood that the present disclosure may be presented in many different ways and is not limited to the embodiments described below; in fact, the embodiments described below are intended to make the disclosure of the present disclosure more complete and to fully explain the protection scope of the present disclosure to those of ordinary skill in the art. It should also be understood that the embodiments disclosed in the present disclosure may be combined in various ways so as to provide more additional embodiments.

It should be understood that the terms used herein are only used to describe specific embodiments, and are not intended to limit the scope of the present disclosure. All terms used herein (including technical terms and scientific terms) have meanings normally understood by those skilled in the art unless otherwise defined. For brevity and/or clarity, well-known functions or structures may not be further described in detail.

As used herein, when an element is said to be "on" another element, "attached" to another element, "connected" to another element, "coupled" to another element, or "in contact with" another element, etc., the element may be directly on another element, attached to another element, connected to another element, coupled to another element, or in contact with another element, or an intermediate element may be present. In contrast, if an element is described as "directly" "on" another element, "directly attached" to another element, "directly connected" to another element, "directly coupled" to another element or "directly in contact with" another element, there will be no intermediate elements. As used herein, when one feature is arranged "adjacent" to another feature, it may mean that one feature has a part overlapping with the adjacent feature or a part located above or below the adjacent feature.

As used herein, spatial relationship terms such as "upper", "lower", "left", "right", "front", "back", "high", and "low" can explain the relationship between one feature and another in the drawings. It should be understood that, in addition to the orientations shown in the attached drawings, the terms expressing spatial relations also comprise different orientations of a device in use or operation. For example, when a device in the attached drawings rotates reversely, the features originally described as being "below" other features now can be described as being "above" the other features". The device may also be oriented by other means (rotated by 90 degrees or at other locations), and at this time, a relative spatial relation will be explained accordingly.

As used herein, the term "A or B" comprises "A and B" and "A or B", not exclusively "A" or "B", unless otherwise specified.

As used herein, the term "schematic" or "exemplary" means "serving as an example, instance or explanation", not as a "model to be accurately copied". Any realization method described exemplarily herein may not be necessarily interpreted as being preferable or advantageous over other realization methods. Furthermore, the present disclosure is not limited by any expressed or implied theory given in the above technical field, background art, summary of the invention or embodiments.

As used herein, the word "basically" means including any minor changes caused by design or manufacturing defects, device or component tolerances, environmental influences, and/or other factors.

As used herein, the term "at least part" may be a part of any proportion. For example, it may be greater than 10%, 20%, 30%, 40%, 50%, 60%, 70%, 80%, 90%, or may even be 100%, i.e. all.

In addition, for reference purposes only, "first", "second" and similar terms may also be used herein, and thus are not intended to be limitative. For example, unless the context clearly indicates, the words "first", "second" and other such numerical words involving structures or elements do not imply a sequence, order or preference.

It should also be understood that when the term "comprise/include" is used herein, it indicates the presence of the specified feature, entirety, step, operation, unit and/or component, but does not exclude the presence or addition of one or a plurality of other features, steps, operations, units and/or components and/or combinations thereof.

In some base station antennas, fences may be mounted between different radiating elements. Fences are often used in base station antennas that include a multi-column array of radiating elements. These fences may include vertically extending fences, which extend parallel to the longitudinal axis of the base station antenna, and may also include horizontally extending fences. These fences may be designed to improve the degree of isolation between adjacent columns of radiating elements and/or to adjust the radiation boundary of the array of radiating elements (e.g., they may be designed to narrow the azimuth and/or elevation beamwidths of the antenna beams generated by a multi-column array of radiating elements included in the antenna). However, mounting these fences on a reflector or a feed board will also undesirably increase the cost and/or weight of the base station antenna. In addition, the fences may also make it more difficult to route feed traces for the radiating elements on the feed boards as the fences usually span a plurality of radiating elements and therefore have a longer extension dimension.

In addition, with the development of the communication system, there may be higher requirements for the cross-polarization performance of the base station antenna, such as the degree of cross-polarization isolation. The degree of cross-polarization isolation refers to the degree of isolation between radio frequency energy of radiating elements of the base station antenna having a first polarization and radio frequency energy of the radiating elements having second (orthogonal) polarization. The cross-polarization performance of an array of radiating elements of the base station antenna may vary due to an electrical scanning angle of an antenna beam generated thereby (i.e., an angle at which the antenna beam starts electrical scanning from a "visual axis" pointing direction of the radiating element, which is usually an axis extending through the center of the radiating element, which is perpendicular to a reflector with the radiating element installed). It is desirable that the base station antenna maintain good cross-polarization performance over a wide range of scanning angles.

The present disclosure proposes a base station antenna, such as a massive MIMO antenna, and the base station antenna may include one or more feed boards, a multi-column massive MIMO array of radiating elements mounted on the feed board(s), and a plurality of metal tubes (such as an array of metal tubes) mounted to extend forwardly from the feed board(s). At least a portion of the radiating elements or all of the radiating elements in the array of radiating elements may be surrounded by four metal tubes spaced apart, respectively. Four metal tubes surrounding a corresponding radiating element may be configured to tune a radiation boundary of the corresponding radiating element.

In addition, each metal tube or the array of metal tubes may be configured to improve the cross-polarization performance, for example, the cross-polarization discrimination, of the massive MIMO array. The cross-polarization discrimination may be the ratio of the main polarization field strength to the cross-polarization field strength in the maximum radiation direction. In some embodiments, each metal tube or the array of metal tubes may be configured to: improve peak cross-polarization discrimination by at least 2 dB or 3 dB at a horizontal scanning angle greater than a first angle and/or a horizontal scanning angle less than a second angle.

Embodiments of the present disclosure will now be described in greater detail with reference to the accompanying drawings.

FIG. 1 is a schematic perspective view of a base station antenna 100 according to some embodiments of the present disclosure, in which, a radome is removed.

The base station antenna 100 may be mounted on an elevated structure, for example, an antenna tower, a telegraph pole, a building, or a water tower, such that the longitudinal axis thereof extends substantially perpendicular to the ground.

The base station antenna 100 is usually mounted in a radome (not shown) that provides environmental protection. The base station antenna 100 may include a reflector 10, which may include a metal surface that provides a ground plane and reflects electromagnetic waves reaching the reflector, for example, so that electromagnetic waves are redirected to propagate forwardly.

The base station antenna 100 may include one or more antenna assemblies 200 arranged on the front side of the reflector 10, and each antenna assembly 200 may include a feed board 20 and one or more arrays of radiating elements 30 mounted on the feed board 20. Each array of radiating elements 30 may include a plurality of columns of radiating elements 30 arranged in a longitudinal direction V. The longitudinal direction V may be the direction of the longitudinal axis of the base station antenna 100 or may be parallel to the longitudinal axis. The longitudinal direction V is perpendicular to a horizontal direction H and a forward direction F. Each radiating element is mounted to extend forwardly (along the forward direction F) from the reflector 10.

In the illustrated embodiment, the base station antenna 100 may include a plurality of (exemplarily 4) antenna assemblies 200, and each antenna assembly 200 may include a feed board 20 and an array of patch radiating elements 30 mounted on the feed board 20. It should be understood that these patch radiating elements 30 may be radiating elements of various forms, for example, they may be constructed as low-band (617-960 MHz or a sub-band thereof) radiating elements, medium-band (1427-2690 MHz or a sub-band thereof) radiating elements or high-band (3.1-4.2 GHz or a sub-band thereof) radiating elements, etc., and are not limited herein. It should also be understood that the patch radiating elements 30 may be replaced with some other types of radiating elements, such as cross dipole radiating elements in other embodiments.

The base station antenna 100 may also include mechanical and electronic components (not shown), for example, connectors, cables, phase shifters, remote electrical tilt units, or duplexers, etc. that are usually arranged on the rear side of the reflector 10.

Figure 2:
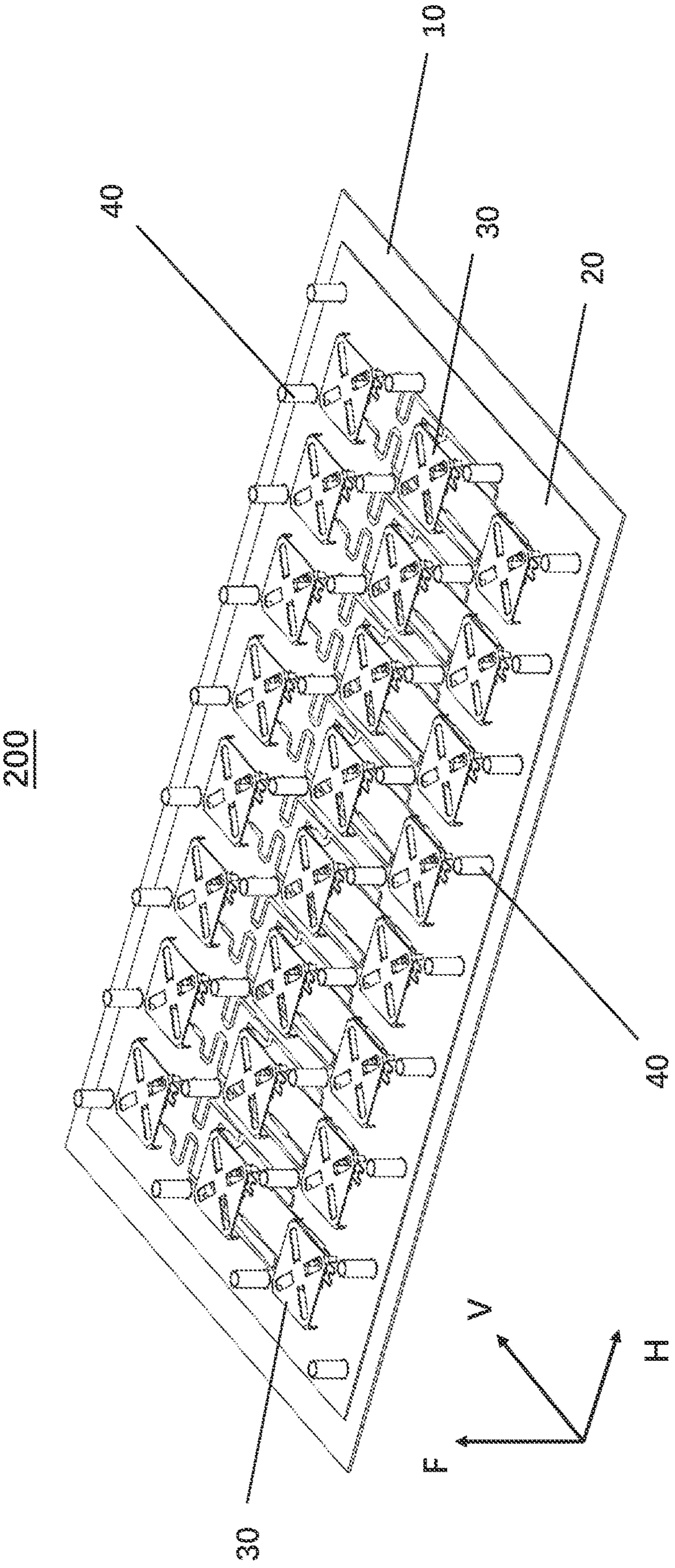
FIG. 2 is a schematic perspective view of an antenna assembly of the base station antenna in FIG. 1.
Figure 3:
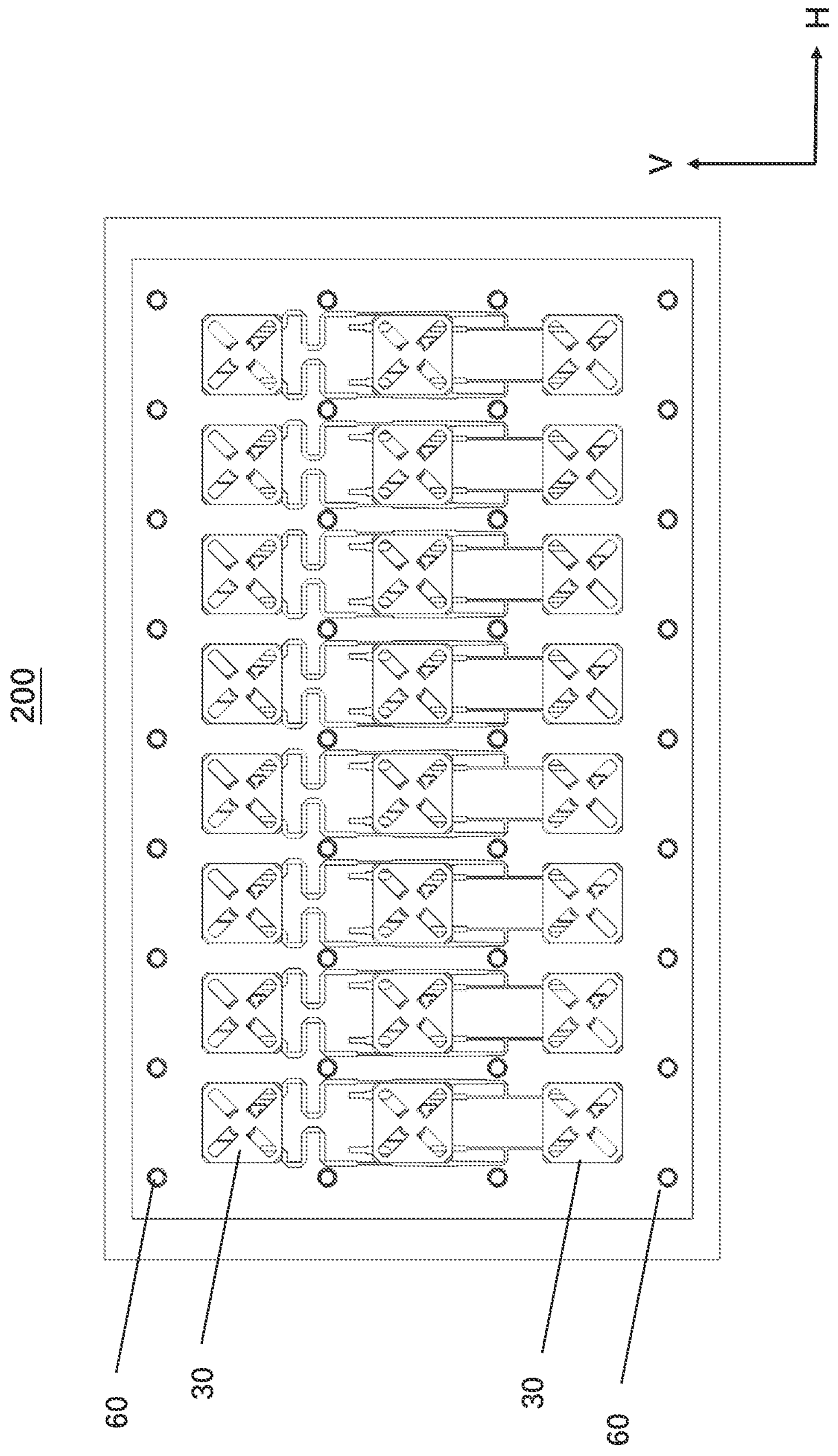
FIG. 3 is a schematic front view of the antenna assembly in FIG. 2.
Figure 4:
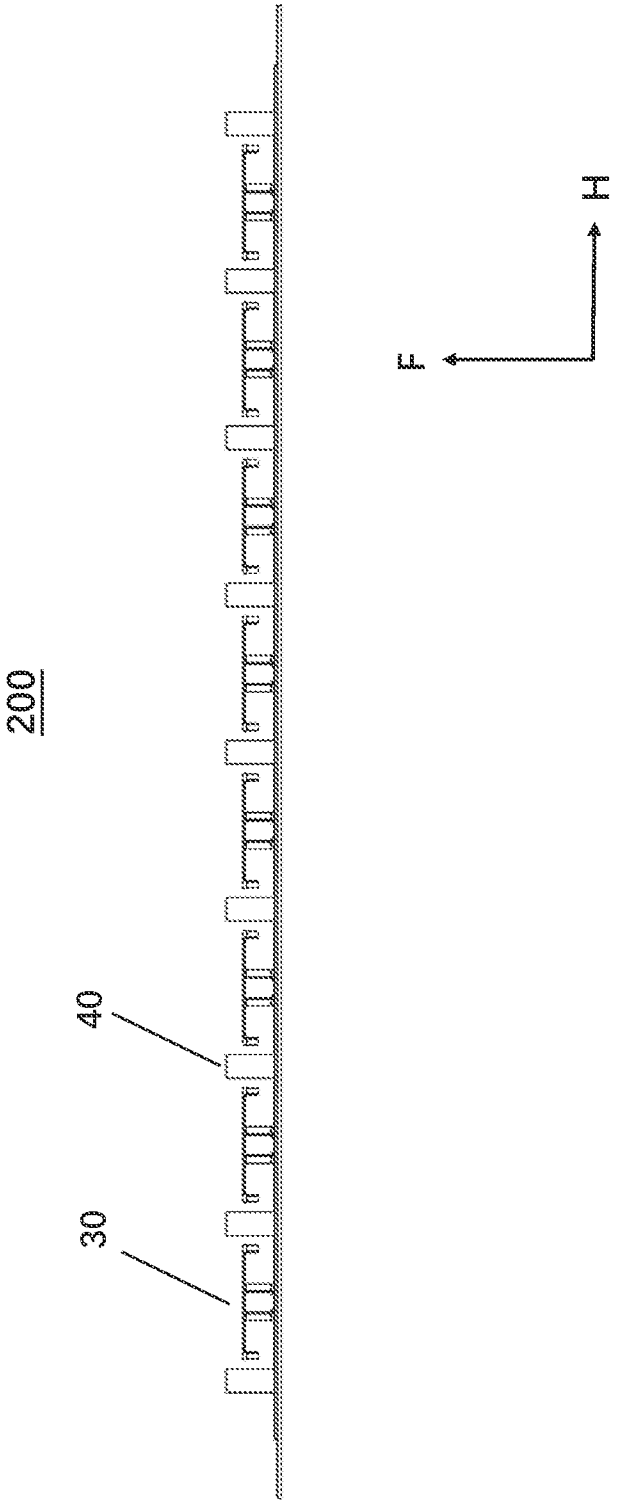
FIG. 4 is a schematic end view of the antenna assembly in FIG. 2.

Next, refer to FIGS. 2 to 4 for a detailed description of the antenna assembly 200 according to some embodiments of the present disclosure. FIG. 2 is a schematic perspective view of the antenna assembly 200 according to some embodiments of the present disclosure. FIG. 3 is a schematic front view of the antenna assembly 200 in FIG. 2. FIG. 4 is a schematic end view of the antenna assembly 200 in FIG. 2.

As shown in FIGS. 2 to 4, the antenna assembly 200 may include a feed board 20, an array of radiating elements 30 mounted on the feed board 20, and an array of metal tubes 40 mounted to extend forwardly F from the feed board 20. The feed board 20 may, for example, include a printed circuit board. In the illustrated embodiment, the array of radiating elements of each antenna assembly 200 may include a plurality of rows and a plurality of columns (3 rows and 8 columns in the figure) of radiating elements 30, where radiating elements arranged along a horizontal direction H are defined as rows and radiating elements arranged along a vertical direction V are defined as columns. A plurality of antenna assemblies 200 are combined to form an array of radiating elements 30 of the entire base station antenna 100. It should be understood that, in other embodiments the number of antenna assemblies 200 and the arrangement forms of arrays of radiating element 30 within each antenna assembly 200 may be flexibly adjusted.

At least some or all of the radiating elements 30 in the array of radiating element 30 may be surrounded by a plurality of metal tubes 40, respectively. In the illustrated embodiment, each radiating element 30 may be surrounded by four metal tubes 40, respectively. A contour, for example a rectangle contour, formed by the four metal tubes 40 may be larger than a contour of the corresponding radiating element 30. Four metal tubes 40 surrounding a corresponding radiating element 30 are at four corners of the corresponding radiating element 30, so that a first metal tube 40 and a second metal tube 40 of the four metal tubes 40 are spaced apart from each other along a longitudinal direction on a first side of the corresponding radiating element 30, and a third metal tube 40 and a fourth metal tube 40 are spaced apart from each other along the longitudinal direction on a second side opposite the first side of the corresponding radiating element 30.

As shown in FIG. 2, two columns of metal tubes 40 are assigned to each column of radiating elements in the array of radiating element 30, and the two columns of metal tubes 40 may be on both sides of the corresponding column of radiating element 30 in the horizontal direction H, respectively. Advantageously, one column of metal tubes 40 may be shared between a first column of radiating elements 30 and a second column of radiating elements 30, and two metal tubes 40 may be shared between every two radiating elements 30 in each column of radiating elements 30. In some embodiments, the array of metal tubes 40 may include a first column of metal tubes 40, a second column of metal tubes 40, and a third column of metal tubes 40. For example, the first column of metal tubes 40 may be arranged between the first column of radiating elements 30 and the second column of radiating elements 30 as a shared column, the first and second columns of metal tubes 40 may be arranged on both sides of the first column of radiating elements 30, and the first and third columns of metal tubes 40 may be arranged on both sides of the second column of radiating elements 30.

It should be understood that the number, the structure, and/or the arrangement of the metal tubes in each column of metal tubes 40 may be flexibly adjusted. In some embodiments, the corresponding metal tubes 40 may also be removed at certain locations where the metal tubes 40 interfere with other functional devices within the base station antenna 100, such as the radome, debugging structures, and/or mechanical support structures. In some embodiments, corresponding metal tubes 40 may also be provided only for a portion of the radiating elements 30 in the column of radiating elements 30.

It should be understood that the metal tubes 40 of the present disclosure may be configured as or include a hollow metal conductor that is elongated in the F direction. The hollow configuration of the metal tube 40 is not only beneficial to reducing manufacturing costs, but also may reduce the weight of the base station antenna 100. The metal tube 40 of the present disclosure may be formed by extrusion forming or punch forming. In some embodiments, the metal tube 40 can be wound and formed by a metal plate. In some embodiments, the metal tube 40 may be configured as a tin-plated hollow aluminum conductor or a tin-plated hollow copper conductor so as to be grounded to the feeder panel. In some embodiments, the metal tube 40 may be configured as a cylindrical hollow metal conductor (as shown in FIG. 2). In other embodiments, the metal tube 40 may have a variety of variant solutions, such as a hollow metal conductor that may be configured to be domed, prismatic, or have a shape of frustum of a pyramid or vase. Advantageously, the metal tube 40 may be constructed as an axially symmetrical structure, because the symmetry of the metal tube 40 is conducive to the symmetry of the electromagnetic environment. In some embodiments, the metal tube 40 may be axially symmetrical with respect to the vertical and/or horizontal direction.

As shown in FIG. 4, the metal tubes 40 may extend forwardly from the feeder panel 20 farther than the patch radiating elements 30. In some embodiments, an extension length of the metal tube 40 may be associated with an operating frequency band of the corresponding array of radiating elements 30. In some embodiments, at least a portion of the metal tubes 40 may be mounted to extend forwardly from the feeder panel 20 by a wavelength of 1/5 to 1/10 or 1/6 to 1/8, which corresponds to a wavelength corresponding to a center frequency of the operating frequency band of the corresponding array of radiating elements 30. In some embodiments, at least a portion of the metal tubes 40 may extend forwardly from the feed board 20 substantially as far as or slightly farther than the radiating element 30. In some applications, when the metal tubes 40 do not extend as far forwardly as the patch radiating elements 30, the metal tubes 40 may have a negative impact on the radiating performance of the radiating elements 30.

Further, an outer diameter of the metal tube 40 may be considered a critical parameter. In some embodiments, the outer diameter of each metal tube 40 may be associated with the operating frequency band of the corresponding array of radiating elements 30. In some embodiments, the outer diameter of each metal tube 40 may be configured to have a wavelength between ⅕ and 1/25, 1/10 and 1/20, which corresponds to the wavelength corresponding to the center frequency of the operating frequency band of the corresponding array of radiating elements 30.

In addition, the size of each metal tube 40 is significantly reduced compared to a traditional fence that extends adjacent to multiple radiating elements 30. The extension length of one radiating element 30 in the vertical direction V may be significantly longer than the extension length of one metal tube 40 in the vertical direction V, for example, by more than 1.5 times, 2 times, or even 3 times. The extension length of one radiating element 30 in the horizontal direction H may be significantly longer than the extension length of one metal tube 40 in the horizontal direction H, for example, by more than 1.5 times, 2 times, or even 3 times.

Thus, replacing the traditional fence with the array of metal tubes 40 can reduce the weight and/or cost of the base station antenna 100, and can also reduce the routing difficulty of the feeder circuit. As shown in FIG. 2, the metal tube 40 may be mounted in a space between feed lines of adjacent columns of radiating elements 30 such that the feed lines do not have to additionally detoured to avoid the metal tube 40, at least in a partial manner. In some embodiments, in order to balance the weight and/or cost, only some radiating elements 30 in the array of radiating elements 30 may be surrounded by four metal tubes 40. In some embodiments, a reduced number of metal tubes 40 may be provided for a portion of the radiating elements 30, for example, a portion of the radiating elements 30 may be surrounded by three or two metal tubes 40.

In addition, the aforementioned arrangement of the array of metal tubes 40 may also maintain good isolation performance between adjacent columns of radiating elements 30. Therefore, the antenna assembly 200 according to some embodiments of the present disclosure may omit some, or even all, of the fences that are mounted in the traditional design solution to maintain good isolation performance. In some embodiments, the array of metal tubes 40 may be configured to: improve peak cross-polarization discrimination by at least 2 dB or 3 dB at a horizontal scanning angle greater than a first angle (for example, from 30° to 60° or from 40° to 55°), and/or improve the peak cross-polarization discrimination by at least 2 dB or 3 dB at a horizontal scanning angle smaller than a second angle (for example, 0° to 15°).

With further reference to FIGS. 2 and 3, a method of mounting the metal tubes 40 on the feed board 20 is described in detail. The base station antenna 100 sometimes includes an electrically suspended tuning element that can be mounted in front of the reflector 10, such as a tuning pin that is basically parallel to the reflector 10, for fine-tuning the shape of the antenna beam generated by the base station antenna 100. However, such electrically suspended tuning element cannot be used to form the radiation boundary of the array of radiating elements 30 of the base station antenna 100. Instead, the array of metal tubes 40 according to some embodiments of the present disclosure may be electrically connected to the feed board 20 and/or the reflector 10 to tune the radiation boundary. The feed board 20 may be printed with ground pads 60 for the corresponding metal tubes 40. The ground pads 60 may be electrically connected to a ground layer on the back of the feed board 20 through a metalized via or another conductor. In addition, in order to efficiently and reliably assemble the antenna assembly 200, each metal tube 40 and each radiating element 30 may be mounted to the feed board 20 by means of surface mounting technology.

Next, referring to FIGS. 5A to 5G, exemplary variant solutions for the metal tube 40 according to some embodiments of the present disclosure are shown.

Figure 5C:
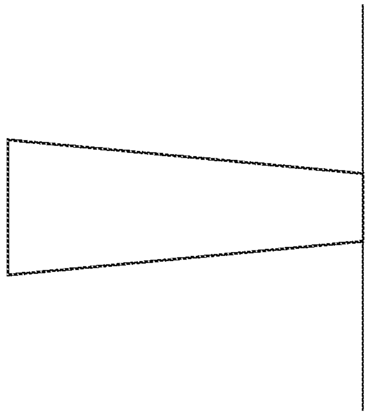
FIGS. 5A, 5B, 5C, 5D, 5E, and 5F are exemplary variant solutions of metal tubes according to some embodiments of the present disclosure, respectively.
Figure 5B:
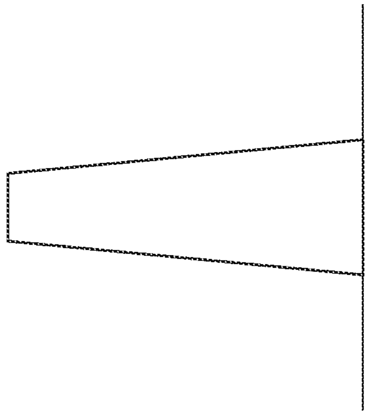
Figure 5A:
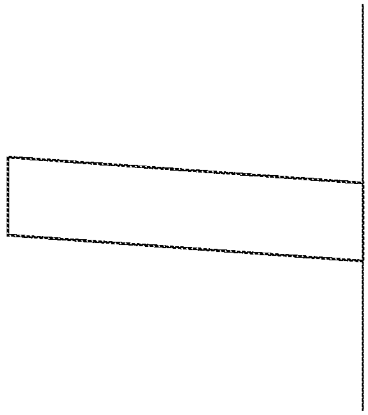

As shown in FIG. 5A, unlike the metal tube 40 extending forwardly substantially perpendicular to the feeder panel 20, the metal tube 40 may extend obliquely forwardly from the feeder panel 20. In some embodiments, the longitudinal axis of the metal tube 40 and the feeder panel 20 may form an acute angle, such as an angle between 60 and 90 degrees.

As shown in FIGS. 5B and 5C, unlike a uniform cross-section of the metal tube 40 at different locations, the metal tube 40 may have a non-uniform cross-section. In some embodiments, the cross-section of the metal tube 40 may gradually increase from rear to front (as in FIG. 5B). In some embodiments, the cross-section of the metal tube 40 may decrease from rear to front (as in FIG. 5C).

Figure 5F:
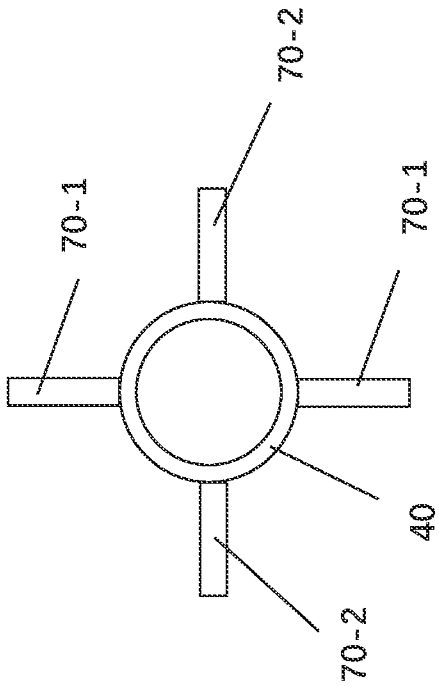
Figure 5E:
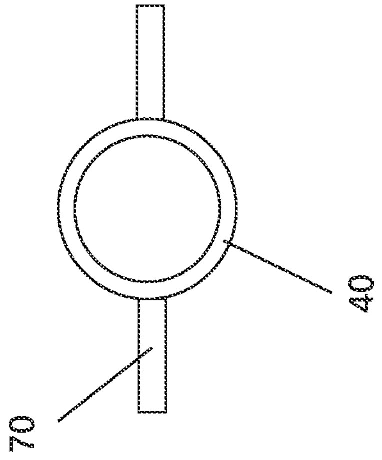
Figure 5D:
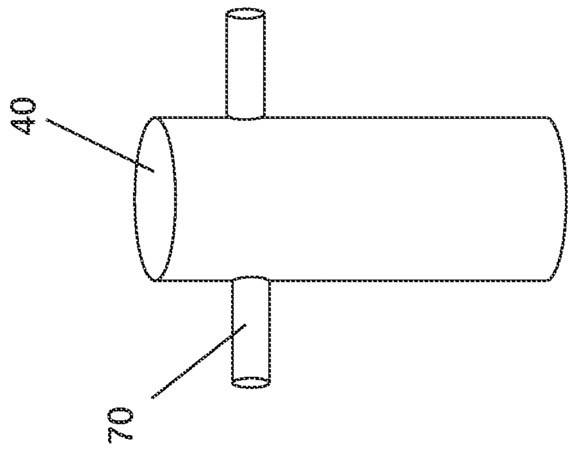

As shown in FIGS. 5D and 5E, a tuning strip 70 may be configured on the metal tube 40, which may extend outward from an outer peripheral wall of a corresponding metal tube 40 by a predetermined distance. In some embodiments, the tuning strip 70 may be configured at a front end portion of the corresponding metal tube 40. In some embodiments, the corresponding tuning strip 70 may extend outward along the longitudinal direction from the peripheral wall of the metal tube 40 by a predetermined distance. In some embodiments, the corresponding tuning strip 70 may extend outward along the horizontal direction from the peripheral wall of the metal tube 40 by a predetermined distance.

As shown in FIG. 5F, a first tuning strip 70-1 extending outward along the longitudinal direction from the outer peripheral wall of the metal tube 40 by a predetermined distance and a second tuning strip 70-2 extending outward along the horizontal direction from the outer peripheral wall of the metal tube 40 by a predetermined distance may be configured on the corresponding metal tube 40.

The metal tube 40 with the tuning strip 70 may provide additional horizontal tuning components and/or vertical tuning components for balancing the horizontal and vertical components of the antenna beam at some scanning angles, thereby improving the cross-polarization performance of the base station antenna 100. In some embodiments, an extension length of the first tuning strip 70-1 may be different (e.g., greater than or less than) than an extension length of the second tuning strip 70-2.

In some embodiments, the metal tube 40 and the tuning strip 70 may be an integrally formed structure.

In some embodiments, the metal tube 40 and the tuning strip 70 may alternatively be a split structure, that is, the tuning strip 70 may be connected, mated, welded, threadedly connected, or bonded to the metal tube 40.

In some embodiments, the metal tube 40 and the tuning strip 70 may be mounted on the feeder panel 20 separately from each other, thereby forming an independent tuning element.

Although exemplary embodiments of the present disclosure have been described, those skilled in the art should understand that many variations and modifications are possible in the exemplary embodiments without materially departing from the spirit and scope of the present disclosure. Therefore, all variations and changes are included in the protection scope of the present disclosure defined by the claims. The present disclosure is defined by the attached claims, and equivalents of these claims are also included.

What is claimed is:

1. An antenna assembly, comprising:
a feed board;
an array of radiating elements mounted on the feed board; and
a plurality of metal tubes mounted to extend forwardly from the feed board in a direction perpendicular to an upper surface of the feed board, wherein at least some of the radiating elements in the array of radiating elements are surrounded by at least four of the plurality of metal tubes spaced apart, respectively.

2. The antenna assembly according to claim 1, wherein the four metal tubes surrounding a corresponding radiating element form a contour larger than a contour of the corresponding radiating element.

3. The antenna assembly according to claim 2, wherein the four metal tubes surrounding the corresponding radiating element form a rectangle contour.

4. The antenna assembly according to claim 1, wherein four the metal tubes surrounding a corresponding radiating element are at four corners of the corresponding radiating element, so that the first metal tube and the second metal tube of the four metal tubes are spaced apart from each other along a longitudinal direction on a first side of the corresponding radiating element, and a third metal tube and a fourth metal tube of the four metal tubes are spaced apart from each other along the longitudinal direction on a second side opposite the first side of the corresponding radiating element.

5. The antenna assembly according to claim 1, wherein the four metal tubes surrounding a corresponding radiating element are configured to tune a radiation boundary of the corresponding radiating element.

6. The antenna assembly according to claim 1, wherein a column of metal tubes is shared between a first column of radiating elements and a second column of radiating elements in the array of radiating elements.

7. The antenna assembly according to claim 6, wherein two metal tubes are shared between every two radiating elements in the first column of radiating elements, and two metal tubes are shared between every two radiating elements in the second column of radiating elements.

8. The antenna assembly according to claim 1, wherein the array of radiating elements is configured as an array of patch radiating elements.

9. The antenna assembly according to claim 1, wherein distal ends of at least some of the metal tubes extend forwardly from the feed board as far as the radiating elements.

10. The antenna assembly according to claim 1, wherein distal ends of at least some of the metal tubes extend forwardly from the feed board farther than the radiating elements.

11. The antenna assembly according to claim 1, wherein distal ends of at least some of the metal tubes are mounted to extend forwardly from the feed board by $1/6$ to $1/8$ of a wavelength which corresponds to a center frequency of an operating frequency band of the corresponding array of radiating elements.

12. The antenna assembly according to claim 1, wherein at least a portion of each metal tube is configured to be cylindrical, domed, prismatic, or have a shape of a frustum of a pyramid.

13. The antenna assembly according to claim 1, wherein some of the metal tubes include respective tuning strips, where each tuning strip extends outwardly from an outer peripheral wall of the corresponding metal tube by a predetermined distance.

14. The antenna assembly according to claim 13, wherein at least one of:
a first tuning strip is configured on a corresponding metal tube, the first tuning strip extending outwardly from an outer peripheral wall of the metal tube by a predetermined distance in a longitudinal direction; and
a second tuning strip is configured on a corresponding metal tube, the second tuning strip extending outwardly from an outer peripheral wall of the metal tube by a predetermined distance in a horizontal direction parallel to the upper surface of the feed board.

15. The antenna assembly according to claim 1, wherein an outer diameter of each metal tube is $1/10$ to $1/20$ of a wavelength which corresponds to a center frequency of an operating frequency band of the corresponding array of radiating elements.

16. The antenna assembly according to claim 1, wherein at least a portion of each metal tube is configured as a hollow metal conductor that is elongated in a direction perpendicular to the upper surface of the feed board.

17. A base station antenna, comprising:
a reflector; and
an antenna assembly mounted in front of the reflector, the antenna assembly comprising:
a feed board;
a plurality of radiating elements mounted on the feed board; and
a plurality of metal tubes mounted to extend forwardly from the feed board in a direction perpendicular to an upper surface of the feed board, wherein at least some of the radiating elements in the plurality of radiating elements are surrounded by at least four of the plurality of metal tubes spaced apart, respectively.

* * * * *